(12) United States Patent
Ikegami et al.

(10) Patent No.: US 10,629,090 B2
(45) Date of Patent: Apr. 21, 2020

(54) PERFORMANCE TRAINING APPARATUS AND METHOD

(71) Applicant: Yamaha Corporation, Hamamatsu-shi, Shizuoka-Ken (JP)

(72) Inventors: Toshiya Ikegami, Hamamatsu (JP); Ushin Tei, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 16/357,814

(22) Filed: Mar. 19, 2019

(65) Prior Publication Data
US 2019/0213906 A1      Jul. 11, 2019

Related U.S. Application Data

(63) Continuation-in-part of application No. PCT/JP2017/033921, filed on Sep. 20, 2017.

(30) Foreign Application Priority Data

Sep. 21, 2016   (JP) .................................. 2016-184058

(51) Int. Cl.
*G10H 1/00*   (2006.01)
*G09B 15/02*   (2006.01)
(Continued)

(52) U.S. Cl.
CPC .......... *G09B 15/023* (2013.01); *G09B 15/00* (2013.01); *G10G 1/00* (2013.01); *G10H 1/00* (2013.01);
(Continued)

(58) Field of Classification Search
CPC .............. G10H 1/00; G10H 2220/015; G10H 2220/101; G10H 2220/106; G10H 2210/145; G10H 2210/031; G10G 1/00
See application file for complete search history.

(56) References Cited

U.S. PATENT DOCUMENTS 6,072,113 A       6/2000   Tohgi et al.
2006/0219091 A1*  10/2006  Ohmura ............... G10H 1/0008
                                                    84/626
(Continued)

FOREIGN PATENT DOCUMENTS

JP    58-28794 A    2/1983
JP    60-177396 A   9/1985
(Continued)

OTHER PUBLICATIONS

International Search Report (PCT/ISA/210) issued in PCT Application No. PCT/JP2017/033921 dated Dec. 19, 2017 with English translation (four (4) pages).
(Continued)

*Primary Examiner* — Marlon T Fletcher
(74) *Attorney, Agent, or Firm* — Crowell & Moring LLP (57) ABSTRACT

For each sound of a model performance, performance information designating a sound generation timing and sound and intensity information indicative of an intensity of the sound are supplied. In accordance with a progression of a performance time and for each sound of the model performance, the intensity information is acquired ahead of the sound generation timing, and the intensity of the sound is presented based on the acquired intensity information. The intensity of the sound is presented in a visual or audible manner. In this way, a human player who receives sound-intensity-related performance operation training can know, through a visual display and/or an audible sound, an intensity of each sound of the model performance before the sound generation timing of the sound. As a result, the human player can practice the performance while being aware of the intensity of each sound of the model performance.

20 Claims, 4 Drawing Sheets (51) Int. Cl.
*G10G 1/00* (2006.01)
*G09B 15/00* (2006.01)

(52) U.S. Cl.
CPC ..... *G10H 1/0033* (2013.01); *G10H 2210/091* (2013.01); *G10H 2220/005* (2013.01); *G10H 2220/271* (2013.01)

(56) References Cited

U.S. PATENT DOCUMENTS

| | | | | |
|---|---|---|---|---|
| 2007/0234881 A1* | 10/2007 | Takehisa | ............... | G09B 15/023 84/609 |
| 2008/0276793 A1* | 11/2008 | Yamashita | ............ | G10H 1/0091 84/611 |
| 2008/0289480 A1* | 11/2008 | Yatsui | ................... | G10H 1/0025 84/613 |
| 2009/0293706 A1* | 12/2009 | Yasushi | .................. | G10H 1/383 84/613 |

FOREIGN PATENT DOCUMENTS

| | | |
|---|---|---|
| JP | 6-301333 A | 10/1994 |
| JP | 10-187022 A | 7/1998 |
| JP | 2002-91290 A | 3/2002 |
| JP | 2006-276333 A | 10/2006 |

OTHER PUBLICATIONS

German-language Written Opinion (PCT/ISA/237) issued in PCT Application No. PCT/JP2017/033921 dated Dec. 19, 2017 (four (4) pages).

International Preliminary Report on Patentability (PCT/IB/338 & PCT/IB/373) issued in PCT Application No. PCT/JP2017/033921 dated Apr. 4, 2019, including English translation of document C2 (German-language Written Opinion (PCT/ISA/237) previously filed on Mar. 19, 2019) (seven (7) pages).

Japanese-language Office Action issued in counterpart Japanese Application No. 2016-184058 dated Nov. 26, 2019 with English translation (seven (7) pages).

\* cited by examiner

FIG. 1

| TARGET LEVEL | DISPLAY |
|---|---|
| STRONG | > > > > > > > > |
| MEDIUM | > > > > |
| WEAK | > |

FIG. 2

| DETECTION LEVEL | DISPLAY |
|---|---|
| STRONG | ■ ■ ■ ■ ■ ■ ■ ■ |
| MEDIUM | ■ ■ ■ ■ |
| WEAK | ■ |

FIG. 3

| COMPARISON RESULT | DISPLAY |
|---|---|
| STRONG | ■ < < < ■ |
| RIGHT | ■ ■ ■ ■ |
| WEAK | ■ > > ■ |

PERFORMANCE TRAINING APPARATUS AND METHOD

PRIORITY

This application is based on, and claims priority to, JP PA 2016-184058 filed on 21 Sep. 2016 and International Patent Application No. PCT/JP2017/033921 filed on 20 Sep. 2017. The disclosure of the priority applications, in its entirety, including the drawings, claims, and the specification thereof, are incorporated herein by reference.

BACKGROUND

The embodiments of the present invention generally relate to apparatus and methods for training (or assisting) a user or human player in a music performance, and more particularly relate to a performance training apparatus, performance training program, and performance training method for efficiently training a user or human player how to impart intensity variation to sounds in a music performance.

An existing performance display apparatus visually displays circular pictures or graphics corresponding to velocities (intensities of sounds) of sound generation events of a reference or model performance and circular pictures or graphics corresponding to velocities (intensities of sounds, namely, intensities of performance operations) of a user's performance. With such a performance display apparatus, it is possible to identify a difference in intensity of each user's performance operation from a corresponding portion of the model performance by, after the user's performance, comparing/visually checking the circular graphics based on the user's performance against the circular graphics of the model performance.

SUMMARY

However, with the performance display apparatus described above, it is not possible for the user to appropriately know (or imagine), before executing each performance operation, an intensity of the performance operation to be executed (namely, intensity of a sound to be performed).

In view of the foregoing prior art problems, it is one of the objects of the present invention to provide a performance training apparatus which enables a user or human player to appropriately know, before executing a performance operation, an intensity of the performance operation to be executed (namely, am intensity of a sound to be performed) and thereby enables the human player to practice a performance while being aware of the intensity of each performance operation to be executed.

In order to accomplish the aforementioned and other objects, the inventive performance training apparatus includes: a database that, for each sound of a model performance, supply performance information designating a sound generation timing and sound and intensity information indicative of an intensity of the sound; an output device; a storage medium storing a program; and a processor for executing the program, the processor, when executing the program, configured to: progress a performance time; and in accordance with a progression of the performance time and for each sound of the model performance, acquire the intensity information ahead of the sound generation timing and present the intensity of the sound based on the acquired intensity information via the output device.

According to the inventive performance training apparatus, the intensity information of each sound of the model performance is acquired ahead of the sound generation timing of the sound, and the intensity of the sound is presented based on the acquired intensity information. Thus, a human player (namely, the user to be trained or user who receives the training) can know the intensity of the sound, for which a performance operation is to be executed by the human player, before the sound generation timing of that sound. In this way, the human player can appropriately execute his or her own performance operation while being aware of (or while having in mind) the intensity of the sound of the model performance. As a result, the human player can appropriately do a performance practice with an awareness of the intensity of each sound.

The disclosure made herein also embraces a performance training method that includes steps corresponding to the constituent elements of the inventive performance training apparatus set forth above. Also disclosed herein is a computer-readable, non-transitory storage medium storing a group of instructions executable by one or more processors for performing the performance training method.

BRIEF DESCRIPTION OF DRAWINGS

Certain embodiments of the present invention will hereinafter be described in detail, by way of example only, with reference to the accompanying drawings, in which.

DETAILED DESCRIPTION

Construction of Electronic Keyboard Musical Instrument

Figure 1:
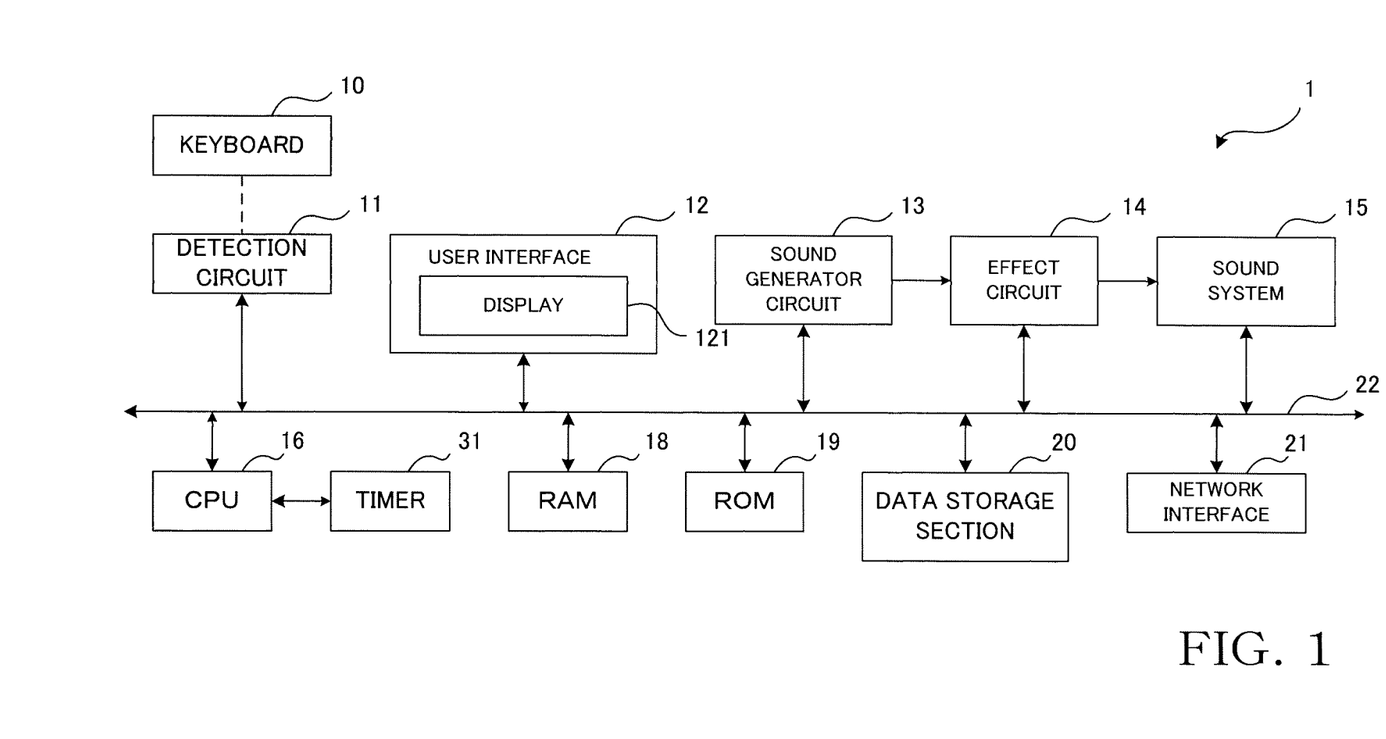
FIG. 1 is a block diagram illustrating an electrical construction of an electronic keyboard musical instrument embodying an inventive performance training apparatus.

An electrical construction of an electronic keyboard musical instrument 1 will be described with reference to FIG. 1. The electronic keyboard musical instrument 1 has not only a function for generating a performance sound in response to a human player operating a keyboard but also a lesson function (namely, a performance training function), and the like. The electronic keyboard musical instrument 1 has an embodiment of an inventive performance training apparatus incorporated therein.

The electronic keyboard musical instrument 1 includes, among others, a keyboard 10, a detection circuit 11, a user interface 12, a sound generator circuit 13, an effect circuit 14, a sound system 15, a CPU 16, a timer 31, a RAM 18, a ROM 19, a data storage section 20, and a network interface 21. The CPU 16 controls various components of the electronic keyboard musical instrument 1 by executing various programs stored in the ROM 19. Here, the "various components" are the detection circuit 11, user interface 12, sound generator circuit 13, network interface 21, etc. that are connected to the CPU 16 via a bus 22. The RAM 18 is used as a main storage device to be used by the CPU 16 to perform various processes. The data storage section 20 stores, among others, music piece data of a MIDI (Musical Instrument Digital Interface (registered trademark)) format.

The data storage section 20 is implemented, for example, by a non-transitory storage medium, such as a flash memory. The timer 31, which counts a time remaining before arrival at a given set time, outputs a signal to the CPU 16 once the remaining time becomes zero.

The keyboard 10 includes pluralities of white keys and black keys corresponding to various pitches (sound pitches). The detection circuit 11 generates a performance detection signal by detecting a performance operation executed on the keyboard 10 and transmits the generated performance detection signal to the CPU 16. On the basis of the performance detection signal received from the detection circuit 11, the CPU 16 generates performance data of the MIDI format.

The sound generator circuit 13 performs signal processing on data of the MIDI format so as to output a digital audio signal. The effect circuit 14 imparts an effect, such as a reverberation, to the audio signal output from the sound generator circuit 13 to thereby output an effect-imparted digital audio signal. The sound system 15 includes, among others, a digital-to-analog converter, an amplifier, and a speaker that are not shown in the drawings. The digital-to-analog converter converts the digital audio signal output from the effect circuit 14 to an analog audio signal and outputs the converted analog audio signal to the amplifier. The amplifier amplifies the analog audio signal and outputs the amplified analog audio signal to the speaker. The speaker sounds or audibly generates a sound corresponding to the analog audio signal input from the amplifier. In this manner, the electronic keyboard musical instrument 1 audibly generates a performance sound in response to a user's or human player's operation on the keyboard 10. The electronic keyboard musical instrument 1 also audibly generates an automatic performance sound on the basis of music piece data stored in the data storage section 20. In the following description, audibly generating an automatic performance sound is sometimes referred to simply as reproducing or reproduction. Note that one of functions of the data storage section 20 is a database for supplying the music piece data. Also, the RAM 18 and/or the ROM 19 can function as such a database for supplying the music piece data. A group of the data storage section 20, RAM18 and/or the ROM 19 functions as a local memory for supplying (or storing) the music piece data.

The user interface 12 includes a display (such as a liquid crystal display) 121 and a plurality of operating buttons, such as a power button and a "start/stop" button or key, which are not shown in the drawings. The user interface 12 displays various setting screens etc. on the display 121 in accordance with instructions given by the CPU 16. Further, the user interface 12 transmits to the CPU 16 a signal representative of an operation received via any one of the operating buttons. The network interface 21 executes LAN communication. The CPU 16 is connectable to the Internet via the network interface 21 and a not-shown router so as to download desired music piece data from a content server or a cloud service computing system that is connected to the Internet so as to supply music piece data via the Internet. Such a content server or a cloud service computing system also functions as a database for supplying the music piece data.

Note that the user interface 12 is located in a rear portion of the keyboard 10 as viewed from the human player operating the keyboard 10. Thus, the human player can execute a music performance while viewing displays shown on the display 121.

Outline of Lesson Function

Next, a description will be given of the lesson function (namely, a primary function as the performance training apparatus) of the electronic keyboard musical instrument 1. Although the electronic keyboard musical instrument 1 has a plurality of types of lesson functions, the following description will mainly describe the primary lesson function (intensity lesson function) which gives the human player (user) a lesson about intensities of operating force with which to depress various keys of the keyboard 10. Note that such an "intensity" of operating force with which to depress a keyboard key can also be referred to as a "velocity" at which to depress the key. When a loud sound is to be generated, the human player depresses a key of the keyboard 10 strongly or with a strong intensity. The detection circuit 11 detects a velocity at which a key of the keyboard 10 is depressed and outputs a signal indicative of the detected velocity as "velocity" data (namely, data indicative of an intensity of a sound). It is known that the more strongly the human player depresses a key of the keyboard 10, the higher becomes the velocity at which the key is depressed. Namely, the more strongly the human player depresses the key, the greater becomes the value of the "velocity", and hence the greater becomes the volume of a performance sound generated by the sound system 15. Note that a lesson function (key depression guide function) to provide display for visually guiding the human player about each key to be depressed by the human player is conventionally known. The following paragraphs describe an example in which is executed a training program composed of a combination of an intensity lesson function according to an implementation of the present invention and the conventionally known key depression guide function.

Note that if the human player depresses a key different from a key of the reference or model performance, a sound of a pitch different from a pitch of the key of the model performance is generated, and thus, the human player can easily notice that he or she has depressed the wrong key. Particularly, if the human player is a beginner player, it is difficult for the human player to determine whether an intensity with which the player is depressing a key of the keyboard 10 is greater or smaller (stronger or weaker) than, or about the same as, an intensity specified in the model performance. Thus, the intensity lesson function employed in the present embodiment is specifically designed to enable the human player to depress a key of the keyboard 10 appropriately with any one of three different intensity levels. Namely, according to the intensity lesson function in the present embodiment, intensity levels of sounds are limited to, or classified into, three stages so as to enable the human player to easily identify differences among the intensity levels.

The following briefly describe an outline of a structure of training music piece data (training music piece data set) according to an implementation of the present invention. The training music piece data structure of a music piece is composed mainly of an intro section and a practicing section. The intro section, which is a preliminary section that appears before the start of a musical progression of the music piece to be practiced, presents to the user examples or samples of ways of presenting intensities of sounds for purposes of the intensity lesson function. The practicing section, which is a main section to be performed after the start of the musical progression of the music piece to be practiced, is composed of a combination of the key depression guide function and the intensity lesson function. More specifically, the intro section presents to the human player in advance all of ways of visually and audibly presenting three stages of intensity levels by use of audible sounds and visual displays, so as to enable the human player to know (or imagine) differences among the three stages of intensity levels that are to be visually and audibly presented. Upon entry into the practicing section of the music piece data, an intensity (i.e., any one of the three stages of levels) of a sound to be generated (namely, a sound for which a performance operation is to be executed by the user) is presented to the user visually and/or audibly prior to a sound generation timing of the sound to be generated. In the audible presentation, for example, an intensity with which to depress a key is aurally presented to the human player by a sound of volume corresponding to the intensity of the sound to be performed being audibly generated. Further, through the key depression guide function executed concurrently or parallel with the intensity lesson function, a guide display is executed for guiding the human player about the key for which the performance operation is to be executed, and a timing (sound generation timing) at which the key is to be depressed is visually informed to the human player. Once the human player depresses the key instructed by the key depression guide function with the intensity presented by the intensity lesson function, the intensity (namely, any one of the three-stage levels) with which the human player has depressed the key is displayed on the display 121. Then, a result of comparison between the intensity with which the human player has depressed the key and the intensity instructed in the model performance (model intensity) is displayed on the display 121 to indicate whether the intensity of the user's performance operation is strong or weak relative to the model intensity. Note that a musical intro performance may be executed in the intro section, concurrently with the presentation of the sample sounds and visual displays, in accordance with a conventionally known automatic performance technique.

In the following description, each sound audibly generated by the electronic keyboard musical instrument 1 for audibly presenting an intensity (loudness) of the sound ahead of the sound generation timing of the sound in order to cause the human player (user) to imagine the intensity (loudness) of the sound in accordance with the intension lesson function will be referred to as "presented sound", and a display executed by the electronic keyboard musical instrument 1 for visually presenting the intensity of the sound ahead of the sound generation timing will be referred to as "presented level display". Further, guide-displaying a key to be depressed near a predetermined sound generation timing (key operation timing) in accordance with the key depression guide function will be referred to as "pitch guide display". Furthermore, an intensity level shown on the presented level display will be referred to as "target level", and an intensity level with which the human player has depressed a key will be referred to as "detected level".

Display Screen

Next, a description will be given of a display screen shown on the display 121 during execution of the lesson function. A schematic plan view of the keyboard 10 (hereinafter referred to as "keyboard view") and an intensity indicator is displayed on the display screen. The pitch guide display is implemented by a pitch to be performed being clearly indicated on the keyboard view. The intensity indicator is an indicator that displays an intensity level etc., and the presented level display is implemented by use of such an intensity indicator. Details of the intensity indicator will be set forth below. Furthermore, a state where the pitch guide display is being executed on the keyboard view will be referred to as "ON state", whereas a state where the pitch guide display is not being executed on the keyboard view will be referred to as "OFF state". Similarly, a state where the presented level display is being executed on the intensity indicator will be referred to as "ON state", whereas a state where the presented level display is not being executed on the intensity indicator will be referred to as "OFF state".

Intensity Indicator

Figure 2:
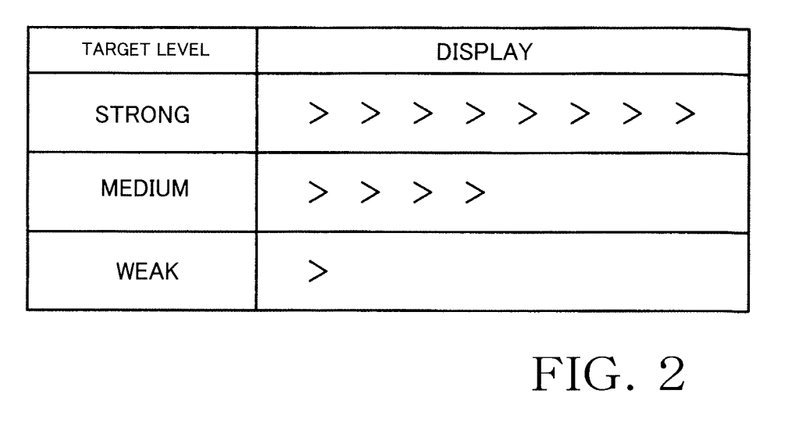
FIG. 2 is a diagram explanatory of target levels and level indicating graphics.
Figure 3:
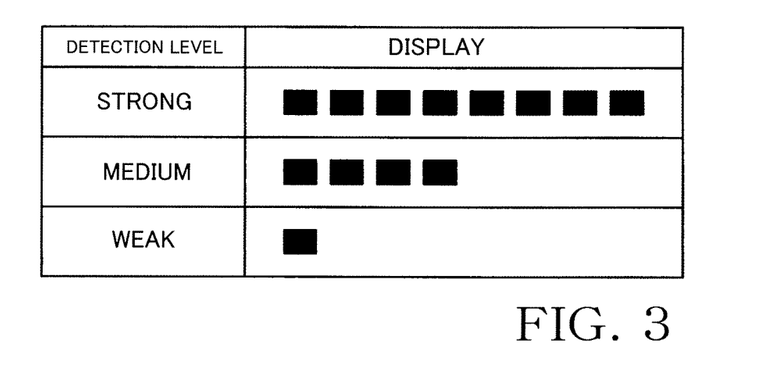
FIG. 3 is a diagram explanatory of detected levels and level indicating graphics.
Figure 4:
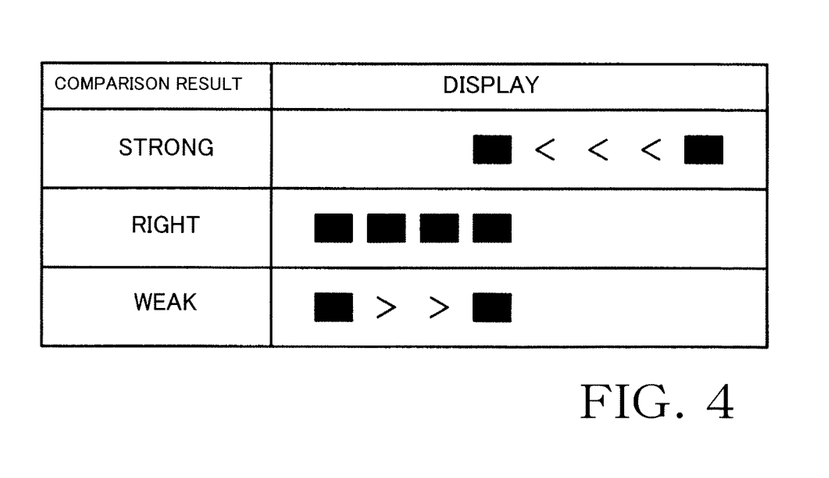
FIG. 4 is a diagram explanatory of comparison results and result indicating graphics.

Next, with reference to FIGS. 2 to 4, a description will be given of several types of the intensity indicator employed in the present embodiment. In the presented level display, as illustrated in FIG. 2, the target level (namely, intensity of a sound in the model performance) is indicated by the number of ">" marks (hereinafter referred to as "angle bracket marks"). More specifically, the electronic keyboard musical instrument 1 displays a strong level by a level indicating graphic formed of eight angle bracket marks, a medium level by a level indicating graphic formed of four angle bracket marks, and a weak level by a level indicating graphic formed of one angle bracket mark. In the display of an intensity with which the human player has depressed a key, as illustrated in FIG. 3, the detected level (namely, detected intensity level of a sound performed by the user) is indicated by the number of black rectangular marks. More specifically, the electronic keyboard musical instrument 1 displays a strong detected level by a level indicating graphic formed of eight black rectangular marks, a medium detected level by a level indicating graphic formed of four black rectangular marks, and a weak detected level by a level indicating graphic formed of one black rectangular mark. A result of comparison between the intensity of a sound in the model performance and the intensity of a sound in the user's performance (namely, information indicative of a difference between the intensities of the two sounds) is displayed in a manner as illustrated in FIG. 4. In a case where the detected level is strong relative to the target level, the electronic keyboard musical instrument 1 displays a level indicating graphic indicative of "strong" that is formed of a combination of left-pointing angle bracket marks and black rectangular marks. In a case where the detected level is within a predetermined range of the target level, the electronic keyboard musical instrument 1 displays a level indicating graphic indicative of "right" that is formed of black rectangular marks alone. Further, in a case where the detected level is weak relative to the target level, the electronic keyboard musical instrument 1 displays a level indicating graphic indicative of "weak" that is formed of a combination of right-pointing angle bracket marks and black rectangular marks.

Music Piece Data

Next, a description will be given of music piece data (music piece data set) used in the present embodiment. The music piece data used in the present embodiment is data optimized for a music performance lesson and thus is different from ordinary music piece data. The music piece data used in the present embodiment is composed of the intro section and the practicing section, as set forth above. In the practicing section, appropriate time periods are set for sequentially guiding the human player (users) about keys that are to be sequentially depressed by the human player for a music piece performance. Namely, the practicing section is constructed in such a manner that a pitch guide display is executed for prompting the human player to depress a key, then a given time period is set for the user to depress the key, then a next pitch guide display is executed, and so on.

The music piece data (or music piece data set) includes music piece information (header information) and a group of event information recorded on a plurality of tracks. The music piece information (header information) includes information other than the event information, such as a music piece name of the music piece data. On each of the tracks, pairs of data, each constituted by time information and an event, are arranged in accordance with progression sequences of an automatic performance and of various displays that relate to the music piece. The event is data indicative of content of processing, and the time information is data indicative of a processing time. Lesson data are recorded on one or more of the plurality of tracks, and accompaniment data are recorded on the other tracks. Examples of the event include, among others, "note-on" and "note-off" that are MIDI events, and "keyboard-display-on", "keyboard-display-off", "intensity-display-on" and "intensity-display-off" that are meta events. Note that the "keyboard-display-on", "keyboard-display-off", "intensity-display-on", and "intensity-display-off" are recorded on the lesson track or tracks. "note-on" events each for starting generation of a presented sound and "note-off" events each for silencing or deadening a presented sound are also recorded on the lesson track(s).

As well known in the art, the "note-on" event is an event that instructs the start of generation of a sound (note), whereas the "note-off" event is an event that instruct deadening of a currently generated sound (note). A "note number", "velocity", etc. are attached to the "note-on" and "note-off" events. The "note number" is data designating a pitch, and the "velocity" is data indicative of an intensity of a sound. However, the following description will focus mainly on the "note-on" or "note-off" event for starting generation of or deadening a presented sound according to an implementation of the present invention. It should be noted that the presented sound to be generated or deadened on the basis of such a "note-on" or "note-off" event does not necessarily have to have a pitch designated by a "note number", as described later. As an example, the data of the "note number" attached to the "note-on" or "note-off" event for starting generation of or deadening the presented sound is constituted by information designating a particular sound that corresponds to any one of a plurality of (for example, three) stages of intensity levels of presented sounds that are used for audibly presenting the plurality of stages of intensity levels, and the data of the "velocity" attached to the note-on or note-off event is constituted by information designating volume (sound volume) at which the particular sound is to be generated. As an example, particular sounds corresponding to the individual stages of intensity levels are sounds having particular sound colors (timbres) and pitches (temporally varying pitches), such as a "cry of a dog", "cry of a cat", and "cry of a bird", as set forth below. In this case, because the intensity level of the sound audibly presented by the presented sound is identifiable by the corresponding particular sound, the value of the "velocity" attached to the "note-on" event does not necessarily have to correspond to the intensity level of the sound to be presented by the presented sound and may be a desired value. However, the present embodiment is not so limited, and as a modification, sounds having a same sound color and/or same pitch may be used as the particular sounds corresponding to the individual stages of intensity levels of the presented sounds. In such a case, the value of the velocity attached to the "note-on" event may be set at a value corresponding to the intensity level of the sound to be presented by the presented sound so that the sound intensity level is audibly presented by the volume at which the presented sound is generated.

The "keyboard-display-on" and "keyboard-display-off" events are data for the pitch guide display. "note number", time information, etc. are attached to the "keyboard-display-on" and "keyboard-display-off" events. The "note number" attached to the "keyboard-display-on" and "keyboard-display-off" events designates a pitch of a sound in the lesson music piece, and the time information corresponding to the "keyboard-display-on" and "keyboard-display-off" events designates a sound generation timing of a sound in the lesson music piece. Thus, the "keyboard-display-on" and "keyboard-display-off" events and the time information corresponding thereto correspond to performance information that designates a sound generation timing and sound for each sound of the model performance.

The "intensity-display-on" and "intensity-display-off" events are data for the aforementioned presented level display. Corresponding time information, "velocity" data, etc. are attached to the "intensity-display-on" and "intensity-display-off" events. These "intensity-display-on" and "intensity-display-off" events for the presented level display are in corresponding relationship with the "note-on" and "note-off" events for the presented sound, respectively. The "intensity-display-on" and "intensity-display-off" events are used to visually present an intensity of each sound of the model performance, and the "note-on" and "note-off" events are used to audibly present the intensity of the sound of the model performance. Thus, for a same sound included in the model performance, the time information corresponding to the "intensity-display-on" event for presented level display and the time information corresponding to the "note-on" event for presented sound generation each indicates a same timing in such a manner that the intensity of the same sound is presented in visual and audible manners at the same timing. Needless to say, the "velocity" data attached to the "intensity-display-on" event for presented level display indicates the same intensity level as the intensity level (namely, any one of the plurality of stages of intensity levels) of the sound represented by the corresponding "note-on" event for presented sound generation. The time information corresponding to the "intensity-display-on" event for presented level display and the time information corresponding to the "note-on" event for presented sound generation (such events are designed to visually and audibly present the intensity of any one of the sounds in the model performance) are set to precede, by a predetermined preceding time (such as a time corresponding to one beat at a normal performance tempo), the time information corresponding to the "keyboard-display-on" event of the sound of the model performance that corresponds to the presented-level displaying "intensity-display-on" event and the presented-sound generating "note-on" event. Thus, ahead of the sound generation timing of each sound of the model performance (namely, the timing indicated by the time information corresponding to the "keyboard-display-on" event), the intensity information (namely, the aforementioned presented-level displaying "intensity-display-on" event and the presented-sound generating "note-on") can be acquired, so that the intensity of the sound (namely, an intensity of a key depression operation) can be presented to the human player prior to the sound generation timing of the sound for which the key depression operation is to be executed. Note that an end code is recorded at the end of each of the tracks.

Note that typical "velocity" data according to the conventionally known MIDI standard has a value in the range of 0 to 127. As noted above, the lesson function employed in the present embodiment is designed to enable the human player to depress a key of the keyboard 10 with any one of the three different intensity levels. For this purpose, it suffices that, in the music piece data and the lesson function, velocity values be classified in association with the three stages of intensity levels, "strong", "medium", and "weak". As an example, a velocity value range of 1 to 42 is allocated or classified as the weak level, a velocity value range of 43 to 84 is classified as the medium level, and a velocity value range of 85 to 127 is classified as the strong level. Further, it suffices that only three-stage values be used as the values of the "velocity" data included in the individual events recorded on the lesson track(s), namely, "22" as a value indicative of the weak level, "64" as a value indicative of the medium level, and "106" as a value indicative of the strong level. In other words, it suffices that the "velocity" data attached to each of the "intensity-display-on" events be indicative of any one of the above-mentioned three-stage values.

Functional Blocks

Figure 5:
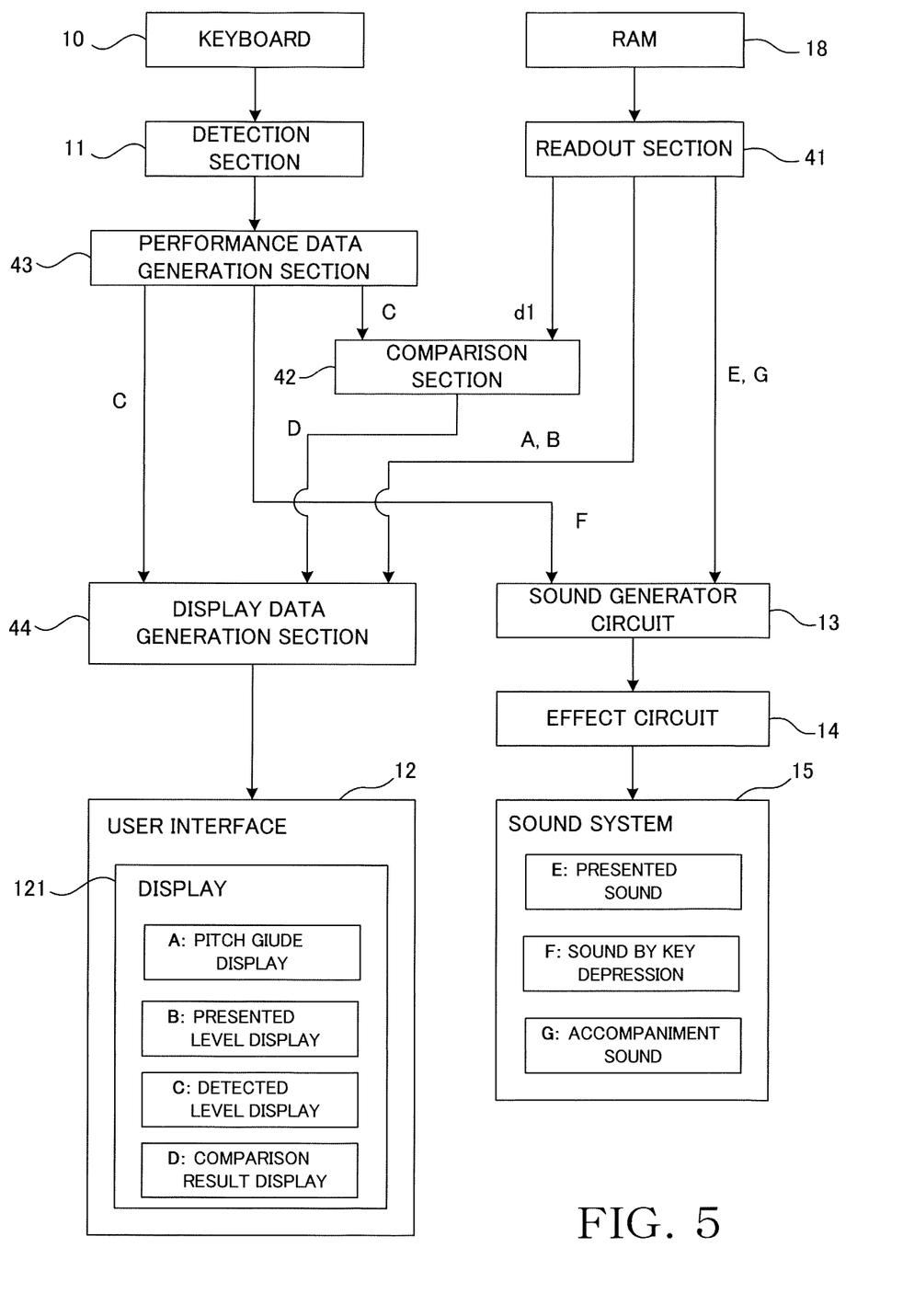
FIG. 5 is a functional block diagram of the electronic keyboard musical instrument embodying the inventive performance training apparatus.

Next, a description will be given of a plurality of functions that can be implemented by the electronic keyboard musical instrument 1, with reference to a functional block diagram of FIG. 5. The electronic keyboard musical instrument 1 is constructed or configured to implement functions of a readout section 41, a comparison section 42, a performance data generation section 43, and a display data generation section 44, in addition to the aforementioned functions. Such readout section 41, comparison section 42, performance data generation section 43, and display data generation section 44 are implemented, for example, by a processor (namely, the CPU 16 of FIG. 1) executing a processing program (tasks) that relates to an inventive performance training method and that is stored in the data storage section 20 in a non-transitory manner. In this case, the readout section 41, comparison section 42, performance data generation section 43, and display data generation section 44 are constituted by program modules (task modules) programmed so as to implement their respective functions.

Once the human player who wants to use the lesson function selects or designates desired music piece data (namely, a desired music piece data set) by operating the user interface 12, the CPU 16 reads out the designated music piece data and stores the read-out music piece data into the RAM 18. If the human player wants to start the lesson function, the player depresses the "start/stop" key of the user interface 12.

Upon determination, based on a signal from the user interface 12, that the "start/stop" key has been depressed, the readout section 41 sequentially reads out the time information and events, included in the individual tracks of the music piece data stored in the RAM 18, from the beginning of the music piece data and outputs, to the comparison section 42, display data generation section 44 and sound generator circuit 13, an instruction specified by each of the events at a timing based on the corresponding time information by use of the timer 31. In this manner, the performance time is progressed; the readout section 41 corresponds to a means or section that progresses the performance time.

If an event to be currently processed as the performance time progresses is a "note-on" or "note-off" event for a presented sound (namely, presented-sound "note-on" or "note-off" event), the readout section 41 not only supplies an instruction (message) E of "note-on" or "note-off" to the sound generator circuit 13 but also supplies "velocity" data dl attached to the "note-on" event to the comparison section 42. If the supplied instruction E of "note-on" or "note-off" instructs "note-on" (start of sound generation), the sound generator circuit 13 generates a sound signal of a particular sound, corresponding to any one of the three stages of presented sounds, in accordance with the "note number" data included in the instruction E of "note-on" and imparts, to the generated sound signal, volume corresponding to the "velocity" data included in the instruction E of "note-on". The sound signal generated by the sound generator circuit 13 is supplied to the sound system 15 via the effect circuit 14. Thus, the presented sound corresponding to the instruction E of "note-on" is audibly generated or sounded from the sound system 15. If the supplied instruction E of "note-on" or "note-off" instructs "note-on" (start of sound generation), the sound generator circuit 13 instructs "note-off" (sound deadening), the sound generator circuit 13 ends the generation of the sound signal of the currently generated presented sound, indicated by the "note number" included in the instruction E of "note-off", to thereby deaden the presented sound.

If an event to be currently processed as the performance time progresses is a "note-on" or "note-off" event for an accompaniment sound, the readout section 41 supplies an instruction (message) G of "note-on" or "note-off" for the accompaniment sound to the sound generator circuit 13. The sound generator circuit 13 generates an accompaniment sound signal or ends generation of the accompaniment sound in accordance with the supplied instruction (message) G of "note-on" or "note-off" for the accompaniment sound. The accompaniment sound signal generated by the sound generator circuit 13 is supplied to the sound system 15 via the effect circuit 14. Thus, the accompaniment sound corresponding to the instruction G of "note-on" and "note-off" is audibly generated or sounded from the sound system 15.

Further, if an event to be currently processed as the performance time progresses is any one of "intensity-display-on", "intensity-display-off", "keyboard-display-on" and "keyboard-display-off" events, the readout section 41 supplies to the display data generation section 44 an instruction B of "intensity-display-on" or "intensity-display-off" or an instruction A of "keyboard-display-on" or "keyboard-display-off". Once the instruction A of "keyboard-display-on" is supplied, the display data generation section 44 creates display data for turning on (placing) the pitch guide display (in the ON state) and outputs the created display data to the user interface 12. Once the instruction A of "keyboard-display-off" is supplied, the display data generation section 44 creates display data for turning off (placing) the pitch guide display (in the OFF state) and outputs the created display data to the user interface 12. In this manner, the pitch guide display is executed on the display 121.

Further, once the instruction B of "intensity-display-on" is supplied, the display data generation section 44 creates display data for turning on (placing) the presented level display (in the ON state) and outputs the created display data to the user interface 12. Furthermore, once the instruction B of "intensity-display-off" is supplied, the display data generation section 44 creates display data for turning off (placing) the presented level display (in the OFF state) and outputs the created display data to the user interface 12. More specifically, if the value of the "velocity" attached to the instruction B of "intensity-display-on" is "22", the display data generation section 44 creates display data including a level indicating graphic for presenting the weak level (weak-level indicating graphic). If the value of the "velocity" is "64", the display data generation section 44 creates display data including a level indicating graphic for presenting the medium level (medium-level indicating graphic). Further, if the value of the "velocity" is "106", the display data generation section 44 creates display data including a level indicating graphic for presenting the strong level (strong-level indicating graphic). In this manner, the presented level display is executed on the display 121.

The performance data generation section 43 creates performance data on the basis of a performance detection signal (signal indicative of a performance operation executed by the user) output from the detection circuit 11 and outputs the thus-created performance data to the comparison section 42, sound generator circuit 13, and display data generation section 44. The performance data is data composed of events and the like. As in the aforementioned music piece data, examples of the events include, among others, "note-on" and "note-off" events, and "note number", "velocity", and the like are attached to the "note-on" and "note-off" events. In this case, the "note number" indicates a pitch of a key depressed or released by the user, and the "velocity" indicates an intensity of the user's key depression operation (namely, intensity of a sound). The performance data output from the performance data generation section 43 is user's performance information that is indicative of the sound performed by the user and that includes information (velocity data) indicative of the intensity of the user's performance operation (namely, intensity of the sound). Thus, the performance data generation section 43 corresponds to a means or section that, in response to a performance operation executed by the user as the performance time progresses, acquires user's performance information indicative of a sound performed by the user. The performance data F output from the performance data generation section 43 is supplied to the sound generator circuit 13 in such a manner that a sound signal having the pitch corresponding to the performance data F ("note-on" or "note-off" event) is generated by the sound generator circuit 13. The sound signal generated by the sound generator circuit 13 is supplied to the sound system 15 via the effect circuit 14 in such a manner that a user performance sound is generated from the sound system 15.

The display data generation section 44 receives "velocity" data C included in the performance data output from the performance data generation section 43, generates, on the basis of a value of the "velocity", display data for displaying a detected level on the intensity indicator, and outputs the thus-generated display data to the user interface 12. More specifically, the display data generation section 44 generates display data for displaying a weak level indicating graphic if the "velocity" value is in the range of "1" to "42", display data for displaying a medium-level indicating graphic if the "velocity" value is in the range of "43" to "84", and display data for displaying a strong-level level indicating graphic if the "velocity" value is in the range of "85" to "127". In this manner, the detected level C is displayed on the display 121.

The comparison section 42 compares the "velocity" data C included in the performance data output from the performance data generation section 43 with the "velocity" data dl of the music piece data output from the readout section 41 and outputs a result of the comparison, namely, a comparison result D, to the display data generation section 44. On the basis of the comparison result D input from the comparison section 42, the display data generation section 44 generates display data for displaying the comparison result D and outputs the thus-generated display data to the user interface 12. More specifically, the comparison section 42 determines which one of the three-stage levels (namely, weak level, medium level, and strong level) the value of the "velocity" data C included in the performance data belongs to. The value of the "velocity" data C is determined as belonging to the weak level if the value is in the range of "1" to "42", determined as belonging to the medium level if the value is in the range of "43" to "84", and determined as belonging to the strong level if the value of the "velocity" data C is in the range of "85" to "127". Then, the comparison section 42 determines whether or not the determined velocity" data of the performance data is of the same level as the level indicated by the "velocity" data dl of the music piece data. The "velocity" data dl of the music piece data is of the weak level if the value of the "velocity" data dl is "22", is of the medium level if the value of the "velocity" data dl is "64", and is of the strong level if the value of the "velocity" data dl is "106", as noted above. If it is determined that the level of the velocity" data of the performance data is of the same as the level of the "velocity" data dl of the music piece data, the comparison section 42 outputs to the display data generation section 44 a comparison result D indicating "right". If it is determined that the level of the velocity" data of the performance data is not of the same as the level of the "velocity" data dl of the music piece data, on the other hand, the comparison section 42 further determines whether or not the level of the velocity" data of the performance data is greater than the level of the "velocity" data dl of the music piece data. If it is determined that the level of the "velocity" data of the performance data is greater than the level of the "velocity" data dl of the music piece data, the comparison section 42 outputs to the display data generation section 44 a comparison result D indicating "strong". If it is determined that the level of the velocity" data of the performance data is smaller than the level of the "velocity" data dl of the music piece data, on the other hand, the comparison section 42 outputs to the display data generation section 44 a comparison result D indicating "weak". The display data generation section 44 generates a level indicating graphic corresponding to the comparison result D and outputs the thus-generated level indicating graphic to the user interface 12. In this manner, the comparison result D is displayed on the display 121. The display of the comparison result D is turned off, for example, in response to the instruction B of "intensity-display-off".

Details of Lesson Function

Figure 6:
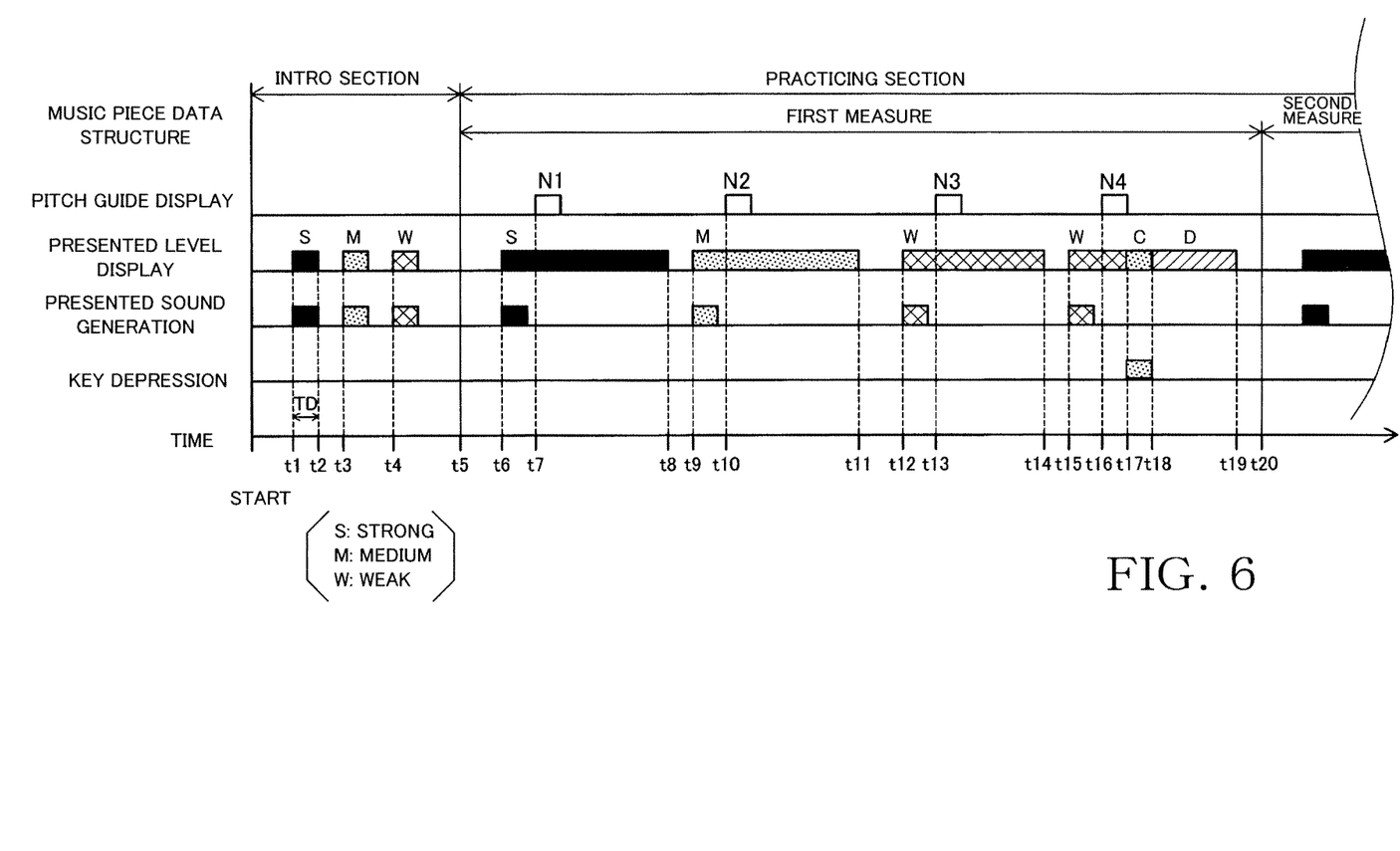
FIG. 6 is a time chart explanatory of a lesson function.

Next, details of the lesson function will be set forth below with reference to FIG. 6. In the horizontal row of "Pitch Guide Display" of FIG. 6, examples of the pitch guide display are illustrated along the time axis, and each time period when the pitch guide display is in the ON state is depicted by a rectangular graphic. In the horizontal row of "Presented Level Display" of FIG. 6, examples of the presented level display are illustrated along the time axis, each time period when the presented level display is in the ON state is depicted by a rectangular graphic, and differences among the target levels (strong, medium, and weak levels) in the presented level displays are distinguished by adding different hatchings in the rectangular graphics. Note that in the horizontal row of "Presented Level Display" of FIG. 6, a time period when a detected level corresponding to a key depression operation is being displayed is depicted by a particular rectangular graphic (C), and a time period when the above-mentioned comparison result is being displayed is depicted by another particular rectangular graphic (D). Further, in the horizontal row of "Presented Sound Generation" of FIG. 6, examples of the generation of presented sounds are illustrated along the time axis, and differences among volume levels (strong, medium, and weak) of the presented sounds to be generated are distinguished by adding different hatchings in the rectangular graphics. Furthermore, in the horizontal row of "Key Depression" of FIG. 6, examples of the user's key depression operation are illustrated along the time axis, and each time period when the user is executing a key depression operation is depicted by a rectangular graphic. The horizontal axis of FIG. 6 is the time axis, and a time point at which the human player depresses the "start/stop" key is set as a starting point of the time axis. FIG. 6 is a diagram for explaining sequences of displays and sound generation by the electronic keyboard musical instrument 1 just for descriptive convenience, and it should be appreciated that FIG. 6 is never intended to limit relative lengths of time periods, such as the ON time periods of the individual displays, to the illustrated examples; namely, the horizontal time axis of FIG. 6 never represents an uniform time scale.

Once the "start/stop" key is depressed, the electronic keyboard musical instrument 1 starts reproduction of an accompaniment. In the intro section, the electronic keyboard musical instrument 1 not only sequentially generates respective presented sounds but also sequentially executes respective presented level displays, as examples or samples for all of the sound intensity levels, namely, strong, medium, and weak levels. The presented sounds differ from one another in terms of the sound type depending on the intensity levels of the sounds. In the illustrated example, the strong level is represented by a cry (such as "ruff") of a dog, the medium level is represented by a cry (such as "mew") of a cat, and the weak level is a cry (such as "peep") of a bird.

For a sound generation time period TD from time t1 to time t2, the electronic keyboard musical instrument 1 displays, as an example or sample, a level indicating graphic indicative of the strong level (strong-level indicating graphic) on the intensity indicator of the display 121 and generates a presented sound of the strong level via the sound system 15, on the basis of information and data read out by the readout section 41. Then, at time t3, the electronic keyboard musical instrument 1 displays, as a sample, a level indicating graphic indicative of the medium level (medium-level indicating graphic) on the intensity indicator and starts generation of a presented sound of the medium level via the sound system 15, on the basis of information and data read out by the readout section 41. Upon lapse of a predetermined sound generation time period TD from time t4, the electronic keyboard musical instrument 1 ends the display of the medium-level indicating graphic and generation of the presented sound. Then, at time t4, the electronic keyboard musical instrument 1 displays, as a sample, a level indicating graphic indicative of the weak level (weak-level indicating graphic) on the intensity indicator and starts generation of a presented sound of the weak level via the sound system 15, on the basis of information and data read out by the readout section 41. Upon lapse of a predetermined sound generation time period TD from time t4, the electronic keyboard musical instrument 1 ends the generation of the presented sound and display of the weak-level indicating graphic on the intensity indicator. In this manner, before entering the practicing section, the human player can listen to the presented sounds, such as "ruff", "mew", and "peep", corresponding to the strong, medium, and weak levels, as samples indicating differences among the intensity levels of the presented sounds. In addition, the human player can imagine the sound intensities by looking at the individual level indicating graphics.

At time t5, the music piece is controlled to shift from the intro section to a first measure of the practicing section on the basis of information read out by the readout section 41. Following time t5, control is performed as follows in accordance with the progression of the performance time on the basis of information and data read out by the readout section 41. A performance (lesson music piece) sequentially instructed in the practicing section according to the key depression guide function (pitch guide display) will be referred to as "model performance". First, at time t6, the electronic keyboard musical instrument 1 starts visual and audible presentations of a sound intensity for a first sound N1 of the model performance on the basis of the note-on" instruction E for presented sound generation and "intensity-display-on" instruction B for presented level display read out by the readout section 41. In the illustrated example, it is assumed that the sound intensity of the first sound N1 of the model performance is of the strong level. Namely, at time t6, the electronic keyboard musical instrument 1 starts displaying the strong-level indicating graphic on the intensity indicator and generating the strong-level presented sound. Then, upon lapse of a predetermined sound generation time period TD from time t6, the electronic keyboard musical instrument 1 ends the generation of the presented sound. Because all of the presented sounds are generated for the same length of time (namely, for the same sound generation time period TD), the description about the ending of the generation of the presented sound will hereinafter be omitted to avoid unnecessary duplication. Upon arrival at time t7 after a lapse, from time t6, of a predetermined time corresponding to the above-mentioned predetermined preceding time (such as the time corresponding to one beat at the normal performance tempo), the electronic keyboard musical instrument 1 executes, for the time period TD from time point t7, a pitch guide display indicating a pitch of the first sound N1 of the model performance on the basis of the "keyboard-display-on" and "keyboard-display-off" instructions A read out by the readout section 41. Then, at time t8, the electronic keyboard musical instrument 1 ends displaying the strong-level indicating graphic on the intensity indicator. Thus, by listening to the presented sound (such as "ruff") during a time period from time t6 to time t7, the human player can know that a sound generation timing at which a key is to be depressed has arrived close at hand. Also, by viewing the above-mentioned pitch guide display (keyboard view) while visually recognizing the strong-level indicating graphic displayed for a time period from time t6 to time t8, the human player can know the pitch (key) for which a key depression operation to be executed as the first sound N1. Note that in the illustrated example of FIG. 6, the human player failed to depress the key for the first sound N1.

At time t9 following time t8, the electronic keyboard musical instrument 1 starts visual and audible presentations of a sound intensity for a second sound N2 of the model performance on the basis of the "note-on" instruction E for presented sound generation and "intensity-display-on" instruction B for presented level display read out by the readout section 41. In the illustrated example of FIG. 6, it is assumed that the sound intensity of the second sound N2 of the model performance is of the medium level. To facilitate the human player to know that the sound intensity changes in the model performance, a time period from time t8 to t9 is set, for example, at a length of about one second as a time for breathing. Thus, the human player can easily visually recognize that the target level changes. Because the lesson music piece is particularly designed to provide training to enable the beginner player to execute key depression operations with intensities corresponding to intensities of sounds presented as the model performance as set forth above, the lesson music piece is not necessarily progressed at an accurate time rate corresponding to the normal performance tempo. For example, although a time range depicted as "one measure" in FIG. 6 indicates one measure in the lesson music piece, this time range of one measure does not necessarily correspond to a time length of a musically accurate one measure (such as a time length of four beats). For instance, the above-mentioned predetermined preceding time is described above as "such as a time corresponding to one beat at a normal performance tempo", a time length corresponding to one beat at a normal performance tempo may be kept in this portion. However, it may be understood that because the time (for example, about one second) for breathing is set from time t8 to time 9, the total time length of the time range of "one measure" in FIG. 6 does not necessarily correspond to a musically accurate one measure (such as a time length of four beats).

At time t9, the electronic keyboard musical instrument 1 starts displaying the medium-level indicating graphic on the intensity indicator and generating the presented sound of the medium level. Also, for the time period TD from time t10 that is later than time t9 by a time corresponding to one beat, the electronic keyboard musical instrument 1 executes a pitch guide display indicating a pitch of the second sound N2 of the model performance. Then, at time t11, the electronic keyboard musical instrument 1 ends displaying the medium-level indicating graphic on the intensity indicator. Then, a time period from time t11 to t12 is set as a time for breathing, similarly to the above. Next, at time t12, the electronic keyboard musical instrument 1 starts visual and audible presentations of a sound intensity for a third sound N3 of the model performance on the basis of the "note-on" instruction E for of presented sound generation and "intensity-display-on" instruction B for presented level display read out by the readout section 41. In the illustrated example of FIG. 6, it is assumed that the sound intensity of the third sound N3 of the model performance is of the weak level. Namely, at time t12, the electronic keyboard musical instrument 1 starts displaying the weak-level indicating graphic on the intensity indicator and generating the weak-level presented sound. Then, upon arrival at time t13 after a lapse, from time t12, of the predetermined time corresponding to the above-mentioned predetermined preceding time (such as the time corresponding to one beat at the normal performance tempo), the electronic keyboard musical instrument 1 executes, for the time period TD from time t13, a pitch guide display indicating a pitch of the third sound N3 of the model performance on the basis of the "keyboard-display-on" and "keyboard-display-off" instructions A read out by the readout section 41. Then, at time t14, the electronic keyboard musical instrument 1 ends displaying the weak-level indicating graphic on the intensity indicator. Note that in the illustrated example of FIG. 6, the human player also failed to depress keys for the second and third sounds N2 and N3.

Then, a time period from time t14 to t15 is set as a time for breathing, similarly to the above. Next, at time t15, the electronic keyboard musical instrument 1 starts visual and audible presentations of a sound intensity for a fourth sound N4 of the model performance on the basis of the "note-on" instruction E for presented sound generation and "intensity-display-on" instruction B presented level display read out by the readout section 41. In the illustrated example of FIG. 6, it is assumed that the sound intensity of the fourth sound N4 of the model performance is of the weak level. Namely, at time t15, the electronic keyboard musical instrument 1 starts displaying the weak-level indicating graphic on the intensity indicator and generating the weak-level presented sound. Then, upon arrival at time t16 after a lapse, from time t15, of the predetermined time corresponding to the above-mentioned predetermined preceding time (such as the time corresponding to one beat at the normal performance tempo), the electronic keyboard musical instrument 1 executes a pitch guide display indicating a pitch of the fourth sound N4 of the model performance on the basis of the "keyboard-display-on" and "keyboard-display-off" instructions A read out by the readout section 41. In the illustrated example of FIG. 6, it is assumed that the human player executes a key depression operation with the medium level from time t17 to time t18. In such a case, a detected level C indicative of the intensity (medium level) of the human player's key depression operation is generated by the performance data generation section 43 in response to the detection circuit 11 detecting this key depression operation, and the medium-level indicating graphic is displayed on the intensity indicator of the display 121 in accordance with the generated detected level C. Then, display data for displaying a comparison result D is output to the user interface 12, and displaying a graphic corresponding to the comparison result D indicating "strong" is started at time t18 and continued until it is ended at time t19. In this manner, the human player can know that the intensity of the human player's depression is stronger than model key depression intensity, namely, a model intensity with which the key depression is supposed to be executed by the human player. Next, at time t20, the music piece is controlled to shift to a second measure of the practicing section. Then, once the readout section 41 reads out the end code of the performance data, or once the start/stop key is depressed, the electronic keyboard musical instrument 1 ends the reproduction of the music piece data.

Next, an additional or supplementary description will be given of the music piece data and functional blocks. For example, on the lesson track(s) of the music piece data having the content illustrated in FIG. 6, "intensity-display-on", "note-on", "note-off", "keyboard-display-on", "keyboard-display-off", and "intensity-display-off" are sequentially arranged as events of portions of the practicing section corresponding to time t5 to time t8. When a plurality of "note-on" events are input as performance data F of the keyboard 10, the sound generator circuit 13 outputs digital audio signals corresponding to the plurality of "note-on" events, and thus, a plurality of sounds corresponding to the performance data F are generated from the sound system 15 in an overlapping manner. When instructions of "intensity-display-on" and "intensity-display-off" that are instructions relating to the display on the intensity indicator, performance data, and a comparison result D are input to the display data generation section 44, the display data generation section 44 processes these instructions and data on a last-come first-served basis. Once performance data is input to the display data generation section 44 at time t17, for example, the display data generation section 44 switches the display on the intensity indicator from the display of the target level (presented level display B) to the display of the detected level C. Further, once the comparison result D is input to the display data generation section 44 at time t18, the display data generation section 44 switches the display on the intensity indicator to the display of the comparison result D. Furthermore, once the instruction B of "intensity-display-off" is input to the display data generation section 44 at time t19, the display data generation section 44 turns off the display on the intensity indicator irrespective of whether the current displayed content on the intensity indicator is the detected level C, comparison result D, or target level (presented level display B).

In the above-described embodiment, the "keyboard-display-on" and "keyboard-display-off" events (instructions A) and the time information corresponding to these "keyboard-display-on" and "keyboard-display-off" events correspond to performance information that designates a sound generation timing and sound for each sound of the model performance. Further, the "intensity-display-on" and "intensity-display-off" events for presented level display and the "velocity" data attached to such events such events (instructions B), and the "note-on" and "note-off" events for presented sound generation (instructions E) correspond to intensity information that indicates a sound intensity for each sound of the model performance. Thus, the data storage section 20 (RAM 18) is an example of a supply means or section (namely, the database) that, for each sound of the model performance, supplies performance information that designates a sound generation timing and sound and intensity information indicative of an intensity of the sound. Further, the aforementioned construction where the readout section 41 sequentially reads out, from the data storage section 20 (RAM 18), the instructions, specified by the individual events, at timings according to the time information is an example of a means or section that progresses the performance time. Furthermore, the time information corresponding to the "intensity-display-on" event for presented level display and the time information corresponding to the "note-on" event for presented sound generation are set to precede, by the above-mentioned predetermined preceding time (such as the time corresponding to one beat at the normal performance tempo), the time information corresponding to the "keyboard-display-on" event of each sound of the model performance corresponding to the intensity-display-on and note-on events. Thus, a display start timing of the presented level display B to be displayed on the user interface 12 via the display data generation section 44 on the basis of read-out output from the readout section 41 and a generation start timing of the presented sound E to be generated from the sound system 15 via the sound generator circuit 13 are controlled to precede, by the above-mentioned predetermined preceding time, a start timing (sound generation timing) of the "keyboard-display-on" corresponding to the display start timing of the presented level display B and generation start timing of the presented sound E (sound generation timing). Thus, the aforementioned construction where the presented sound level display B is executed and the presented sound E is generated ahead of the start timing of the "keyboard-display-on" through cooperation among the readout section 41, display data generation section 44, user interface 12, sound generator circuit 13, and sound system 15 is an example of a presentation means or section that, in accordance with the progression of the performance time and for each sound of the model performance, acquires the intensity information ahead of the sound generation timing and presents the intensity of the sound based on the acquired intensity information. Furthermore, the aforementioned construction where the key depression guide is executed by the display data generation section 44 via the user interface 12 on the basis of the readout output (the instructions A of "keyboard-display-on" and "keyboard-display-off") from the readout section 41 is an example of a performance guide means or section that guides the user about each sound to be performed by the user in accordance with the progression of the performance time on the basis of the performance information of each sound of the model performance.

The above-described embodiments achieve the following advantageous effects. Before a generation timing of each sound for which a keyboard key is to be depressed—such a generation timing can be known to the human player through the key depression guide function (display on the keyboard view)—, the human player can know a presented intensity of the sound, for which the key is to be depressed, through a presented level display on the intensity indicator and generation of a presented sound, and thus, the human player can practice a key depression operation while being aware of (or while having in mind) the intensity of the sound for which the key is to be depressed. Further, because each "intensity-display-on" for presented level display and "note-on" for presented sound generation are located ahead of a corresponding "keyboard-display-on" in a sequential arrangement of data on the lesson track(s), the electronic keyboard musical instrument 1 can display the presented level and generate the presented sound before the sound generation timing. Furthermore, because the human player can know in advance, in the intro section preceding the practicing section, three intensity levels through generation of presented sounds and display of presented levels, the human player can practice a performance while having an image of the performance. In addition, because a comparison result is displayed on the intensity indicator, the human player can know a result of the performance executed by the human player.

Modifications

It should be appreciated that the present invention is not limited to the above-described embodiments and various improvements and modifications of the present invention are of course possible without departing from the basic principles of the present invention. For example, whereas the music piece data has been described above as including the intro section and the practicing section, the music piece data may include only the practicing section without including the intro section. In such a case, the electronic keyboard musical instrument 1 may include an inserted data generation section in order to provide a function similar to the function of the intro section, namely, to present to the human player (user), by way of samples, ways of presenting a sound intensity for each of a plurality of predetermined stages of intensity levels. More specifically, the inserted data generation section is constructed in such a manner that, prior to the start of a performance progression of the practicing section, the inserted data generation section presents to the human player (user), by way of samples, ways of presenting a sound intensity (namely, a way of generating a presented sound and a way of displaying a presented level) for each of a plurality of predetermined stages of intensity levels, without using the intro section. In such a case, information indicative of examples or samples of all of the intensity levels used on the lesson track may be included in the music piece information (header information) of the music piece data. For example, in a case where values of all of three stages of intensity levels corresponding to small, medium, and strong levels are used as "velocity" values in the data of the practicing section stored on the lesson track(s), sample information of all of the small, medium, and strong levels may be included as sample information of the intensity levels to be included in the music piece information (header information). Before the readout section 41 starts reading out the practicing section, the inserted data generation section sequentially outputs to the display data generation section 44 instructions of "intensity-display-on" and "intensity-display-off" of each of the small, medium, and strong levels on the basis of the sample information of the intensity levels included in the music piece information (header information), but also sequentially outputs instructions of "note-on" and "note-off" to the sound generator circuit 13. With such arrangements, display of the presented levels of the small, medium, and strong levels and generation of the presented sounds as presentation samples are executed before the reproduction of the practicing section. Such arrangements enable generation of the presented sounds and display of the presented levels to be executed before the reproduction of the practicing section, even in the case where the music piece data does not include the intro section. Also note that for each intensity level not used in the data (namely, objects of practice) of the practicing section, the sample information of such a not-used intensity level does not have to be included in the music piece information (header information). For instance, in a case where only the medium and strong levels are used in the practicing section, only the presented sounds and presented levels of the medium and strong levels may be presented as samples; such limited presentation is also applicable to the case where the sample information (events) is included in the intro section.

Further, although in the above-described embodiments, "intensity-display-on" and "intensity-display-off" events for presented level display (namely, presented-level displaying "intensity-display-on" and "intensity-display-off" events) and/or "note-on" and "note-off" events for presented sound generation (namely, presented-sound generating "note-on" and "note-off" events) are included (stored) in advance in the practicing section of the music piece data, arrangements may be made such that the presented-level displaying events and presented-sound generating events are not included (stored) in advance on the track(s) of the practicing section. In such a case, in the process of sequentially reading out performance guiding "keyboard-display-on" and "keyboard-display-off" events in accordance with the progression of the performance time, the readout section 41 may determine a timing that precedes, by the above-mentioned predetermined preceding time (such as the time corresponding to one beat at the normal performance tempo), a sound generation timing indicated by the time information corresponding to a next arriving "keyboard-display-on" event, and may then generate and output, at the thus-determined timing, an instruction B of "intensity-display-on" for presented level display and an instruction E of "note-on" for presented sound generation. In such a case, the readout section 41 only has to pre-read "velocity" data attached to the "keyboard-display-on" event and generate, on the basis of the pre-read "velocity" data, "velocity data" (intensity information) to be attached to the generated instruction B of "note-on" for presented level display and the instruction E of "note-on" for presented sound generation. Needless to say, it is assumed here that each "keyboard-display-on" event is accompanied by "velocity" data indicative of an intensity with which a keyboard key is to be depressed in accordance with the "keyboard-display-on" event. In this case, let it be also assumed that the instruction B of "intensity-display-off" corresponding to the instruction B of "intensity-display-on" and the instruction E of "note-off" corresponding to the instruction E of "note-on" generated and output as above are each automatically generated and output by the readout section after a lapse of a predetermined time.

In the above-described embodiments, presented-level displaying "intensity-display-on" events and/or presented-sound generating "note-on" events are included (stored) in advance in the practicing section of the music piece data, as noted above. However, as another modification, such presented-level displaying events and/or presented-sound generating events may be arranged (stored) at same time positions as performance guiding "keyboard-display-on" events corresponding to the presented-level displaying and/or presented-sound generating events, without dedicated time information corresponding to the presented-level displaying and/or presented-sound generating events being included (stored) in advance. Namely, in such a case, the presented-level displaying "intensity-display-on" events and/or presented-sound generating "note-on" events use or share the same time information corresponding to the performance guiding "keyboard-display-on" events that are arranged (stored) at the same time positions as the presented-level displaying "intensity-display-on" events and/or presented-sound generating "note-on" events. In such a case, in the process of sequentially reading out performance guiding "keyboard-display-on" and "keyboard-display-off" events in accordance with the progression of the performance time, the readout section 41 may determine a timing that precedes, by the above-mentioned predetermined preceding time (such as a time corresponding to one beat at the normal performance tempo), a sound generation timing indicated by time information corresponding to a next arriving "keyboard-display-on" event, and may then pre-read, at the thus-determined timing, the instruction B of presented-level displaying "intensity-display-on" and the instruction E of presented-sound generating "note-on" that are arranged (stored) at the same time position as the "keyboard-display-on" event. Because intensity information indicative of a sound intensity is included in each presented-level displaying "intensity-display-on" event and each presented-sound generating "note-on" event that are included (stored) in the practicing section as noted above, the pre-read instruction B of presented-level displaying "intensity-display-on" and instruction E of presented-sound generating "note-on" include intensity information indicative of a sound intensity. In this case too, the instruction B of "intensity-display-off" corresponding to the instruction B of "intensity-display-on" and the instruction E of "note-off" corresponding to the instruction E of "note-on" may each be automatically generated and output after a lapse of a predetermined time.

Furthermore, although cries of animals have been illustrated above as the presented sounds, the presented sounds may be sounds of musical instruments, such as a cymbal, drum, whistle and piano. In such a case, he presented sounds may be chord sounds.

Furthermore, although the pitch guide display in the embodiments of the present invention has been described as clearly indicating a pitch by use of the keyboard view, the embodiments of the present invention are not so limited. Because the lesson function employed in the embodiments is designed for sound intensity lesson, pictures that do not clearly indicate pitches, such as circular marks that are unaccompanied by a keyboard view, may be displayed. Moreover, the embodiments of the present invention do not necessarily have to have the key depression guide function (pitch guide display).

Furthermore, although the embodiments of the present invention have been described above in relation to the case where the time length over which the presented level display is kept in the OFF state when the target level is to be changed is about one second, the embodiments are not so limited. For example, the time length over which the presented level display is kept in the OFF state may be changed in accordance with a reproduction tempo of the music piece data. As an example, when the tempo is slow, the time length over which the presented level display is kept in the OFF state may be set at a time length corresponding to, for example, a phonetic value of a quarter note or half note. Note that the reproduction tempo may be set at a tempo value included in the music piece data or may be set at a tempo set by the human player via the user interface 12 of the electronic keyboard musical instrument 1.

Moreover, although the embodiments of the present invention have been described above in relation to the case where the presented level display is turned off temporarily when the target level is to be changed, the embodiments are not so limited. For example, the latest presented level display may be maintained in the ON state until the target level is changed, in such a manner that the level indicating graphic can be switched to another with no interruption. In such a case, each "intensity-display-off" event located ahead an "intensity-display-on" event in the music piece data may be omitted, because the display data generation section 44 processes input signals on a last-come first-served basis.

Furthermore, although the embodiments of the present invention have been described above in relation to the case where the pitch guide display is executed once in response to a presented sound being generated once, the number of times the pitch guide display is executed is not so limited. For example, the pitch guide display may be executed a plurality of times after a presented sound is generated one or a plurality of times, or the pitch guide display may be executed one or a plurality of times after a presented sound is generated a plurality of times. Further, sound intensities may be presented (by generation of presented sounds and/or display of presented levels) for only one or more sounds for which sound-intensity-related performance practice has to be executed, instead of being presented (by generation of presented sounds and/or display of presented levels) for all pitches (keys) to be shown on the pitch guide display. Namely, the terms "model performance" in the disclosure made herein refers to a model performance relating to sound intensities.

Moreover, although the embodiments of the present invention have been described above as presenting the presented sound generation and presented level display at three stages, the present invention is not so limited, and the presented sound generation and presented level display may be presented at two stages, namely, strong and weak, or at four or more stages. Furthermore, although the embodiments of the present invention have been described above as classifying "velocity" values into the value ranges of 1 to 42, 43 to 84, and 85 to 127, the present invention is not so limited. For example, arrangements may be made so as to enable the human player to freely set velocity value ranges, for example, by operating the user interface 12. Velocity value ranges differing among different music piece data (sets) or among genres of music pieces may be set.

Furthermore, the length of the predetermined preceding time set for presenting a presented level and/or a presented sound ahead of a corresponding sound generation timing (pitch guide display) is not limited to the time length corresponding to one beat and may be a time length shorter than one beat. However, the predetermined preceding time set at the length corresponding to one beat is preferable in that such a preceding time matches a tempo count feeling of the human player and thus facilitates the human player to mentally prepare for executing a key depression operation with a presented sound intensity.

Furthermore, the displayed content on the intensity indicator is not limited to those employed in the above-described embodiments of the present invention. Although the embodiments have been described above in relation to the case where the target level (presented level display), detected level, and comparison result are displayed in a sequentially switching manner, one at a time, all or any two of these may be displayed simultaneously. Furthermore, the level indicating graphics are not limited to those employed in the above-described embodiments of the present invention. For example, the target levels may be displayed in letters or characters, such as "strong", "medium", and "weak", or may be displayed in different colors depending on the levels. Moreover, the aforementioned levels may be displayed in different forms depending on types of displays; for example, the target level (presented level) may be displayed with no blinking or flickering, and the detected level may be displayed with blinking or flickering.

Moreover, although the embodiments of the present invention have been described above as displaying a comparison result, the embodiments are not so limited. For example, an evaluation result, such as "good" or "bad" or evaluation score, may be displayed. In such a case, other items, such as a pitch and/or operation timing of a key depression operation, may be evaluated in addition to a "velocity" (sound intensity) of the key depression operation.

Furthermore, although the embodiments of the present invention have been described above as implementing the readout section 41, comparison section 42, performance data generation section 43, and display data generation section 44, for example, by the CPU 16 (general-purpose processor) executing a program (processing or tasks), the embodiments are not so limited. Such a readout section 41, comparison section 42, performance data generation section 43, and display data generation section 44 may be implemented by dedicated circuits or a combination of dedicated circuits and processing executed by the CPU 16.

Furthermore, although the embodiments of the present invention have been described above in relation to the case where the music piece data (set) is stored in the data storage section 20, the embodiments are not so limited. Music piece data may be downloaded from a server via the network interface 21. Moreover, the electronic keyboard musical instrument 1 is not limited to the above-described construction or configuration and may be constructed or configured to include an interface that transmits and receives (communicates) data to and from a storage medium, such as a USB memory, storing music piece data. Furthermore, although the network interface 21 has been described above as executing LAN communication, the embodiments of the present invention are not so limited, and the network interface 21 may be configured to execute communication conforming to any of other standards, such as MIDI, USB, and Bluetooth (registered trademark) standards. In such a case, the processing may be executed by use of music piece data stored in other equipment, such as a PC or other communication device, connected to a network, or music piece data transmitted from a remote location.

Furthermore, although the music piece data (set) used in the embodiments of the present invention has been described as being of the MIDI format, such music piece data may be, for example, audio data. In such a case, the audio data may be converted into MIDI data so that the processing can be executed by use of the converted MIDI data. Moreover, although the music piece data used in the embodiments of the present invention has been described as having a plurality of tracks, the embodiments are not so limited, and the music piece data may have only one track.

Furthermore, although the electronic keyboard musical instrument 1 has been described above as including the timer 31, the timer function may be implemented by the CPU 16 executing a program.

Furthermore, although the embodiments of the present invention have been described above in relation to the electronic keyboard musical instrument 1 including the keyboard 10 as its performance operator or operation unit, the embodiments are not so limited and can be applied to various other forms of musical instruments or electronic musical instruments where a sound is generated by a blowing operation or by flicking of a string or stick-shaped operator. The embodiments of the present invention may further include a sensor for detecting a moving velocity of a performance operator and may be constructed to display an intensity level of a performance operation in accordance with a detection signal output from the sensor. The embodiments of the present invention may also be constructed to detect volume of a performance sound, for example, by a microphone or the like and display the detected volume as an intensity level.

According to one aspect of the aforementioned embodiment, the performance training apparatus includes a supply section (namely, the aforementioned database) that, for each sound of a model performance, supplies performance information designating a sound generation timing and sound and intensity information indicative of an intensity of the sound, a section that progresses a performance time, and a presentation section that, in accordance with a progression of the performance time and for each sound of the model performance, acquires the intensity information in advance of or ahead of the sound generation timing and presents an intensity of the sound based on the acquired intensity information.

According to another aspect of the aforementioned embodiment, the presentation section may be configured to present the intensity of the sound at least in a visual or audible manner. Further, the presentation section may be configured in such a manner that in a case where the intensity of the sound is to be presented in the visual and audible manners, a time length (or duration) of the presentation in the visual manner is longer than a time length of the presentation in the audible manner. If the time length of the audible presentation is longer than that of the visual presentation, the audible presentation can undesirably disturb the user's performance, and thus, it is preferable that the time length of the audible presentation be relatively short. If the time length of the visual presentation is relatively long, on the other hand, there is no possibility of the visual presentation undesirably disturbing the user's performance; on the contrary, the visual presentation lasting for a relatively long time can make it possible for the user to easily visually recognize a presentation indicative of the intensity of the sound.

According to further aspect of the aforementioned embodiment, the supply section supplies presentation timing information that, in association with the intensity information of each sound of the model performance, specifies a presentation timing, at which the intensity of the sound is to be presented, that precedes the sound generation timing of the sound, and the presentation section may be configured to acquire the intensity information ahead of the sound generation timing in accordance with the presentation timing information and presents the intensity of the sound based on the acquired intensity information. In this way, the presentation section can present the intensity of the sound at an appropriate time point preceding the sound generation timing in accordance with the presentation timing information.

According to furthermore aspect of the aforementioned embodiment, the presentation section presents the intensity of the sound at any one of a plurality of predetermined stages (presentation stages). Further, the presentation section may be configured to present to the user an example or sample of a way of presenting the intensity of the sound for each of the plurality of predetermined stages. Thus, from the presented samples, the user can know, in advance of a performance, how the sound intensity presentation at the plurality of predetermined stages will be, with the result that the user can easily check in advance a degree of intensity of each sound presented during a training performance and thereby do the performance practice with an appropriate awareness of the intensity of each sound of the model performance.

According to another aspect of the aforementioned embodiment, the inventive performance training apparatus includes a section that, in response to a performance operation executed by the user in accordance with the progression of the performance time, acquires user's performance information indicative of a sound performed by the user, the user's performance information including information indicative of an intensity of the sound. The presentation section is configured to, based on the user's performance information, present the intensity of the sound performed by the user. The presentation section is configured to, based on a comparison between the above-mentioned intensity information and the information indicative of the intensity of the sound included in the user's performance information, present information indicative of a difference between the intensity of the sound in the model performance and the intensity of the sound in the user's performance. Such arrangements can facilitate a comparison between an intensity of each sound in the model performance and an intensity of a corresponding sound in the user's performance and thereby achieves enhanced performance training quality.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A performance training apparatus comprising:
   a database that, for each sound of a model performance, supply performance information designating a sound generation timing and sound and intensity information indicative of an intensity of the sound, the sound generation timing corresponding to a timing at which a user is to actuate the performance training apparatus;
   an output device;
   a storage medium storing a program; and
   a processor for executing the program, the processor, when executing the program, configured to:
   progress a performance time; and
   in accordance with a progression of the performance time and for each sound of the model performance, acquire the intensity information ahead of the sound generation timing and present the intensity of the sound based on the acquired intensity information via the output device before the sound generation timing.

2. The performance training apparatus as claimed in claim 1, wherein the processor is further configured to:
   in response to a performance operation executed by a user in accordance with the progression of the performance time, acquire user's performance information indicative of a sound performed by the user, the user's performance information including information indicative of an intensity of the sound; and
   present the intensity of the sound performed by the user based on the user's performance information via the output device.

3. The performance training apparatus as claimed in claim 2, wherein the processor is further configured to, based on a comparison between the intensity information and the information indicative of the intensity of the sound included in the user's performance information, present information indicative of a difference between the intensity of the sound in the model performance and the intensity of the sound in the user's performance.

4. The performance training apparatus as claimed in claim 1, wherein the processor is configured to present the intensity of the sound at least in a visual or audible manner via the output device.

5. The performance training apparatus as claimed in claim 4, wherein the processor is configured in such a manner that in a case where the intensity of the sound is to be presented in the visual and audible manners, a time length of the presentation in the visual manner is longer than a time length of the presentation in the audible manner.

6. The performance training apparatus as claimed in claim 1, wherein the database further supplies presentation timing information that, in association with the intensity information of each sound of the model performance, specifies a presentation timing, at which the intensity of the sound is to be presented, that precedes the sound generation timing of the sound, and wherein the processor acquires the intensity information ahead of the sound generation timing in accordance with the presentation timing information and presents the intensity of the sound based on the acquired intensity information via the output device.

7. The performance training apparatus as claimed in claim 1, wherein the intensity of the sound is presented at any one of a plurality of predetermined stages.

8. The performance training apparatus as claimed in claim 7, wherein the processor is further configured to present to the user, via the output device, an example of a way of presenting the intensity of the sound for each of the plurality of predetermined stages.

9. The performance training apparatus as claimed in claim 1, further comprising a performance guide device that, based on the performance information of each sound of the model performance and in accordance with the progression of the performance time, guides the user about a sound to be performed by the user.

10. The performance training apparatus as claimed in claim 1, wherein the database includes a local memory storing the performance information and the intensity information for each sound of the model performance corresponding to a music piece in which the user is to be trained.

11. A musical instrument comprising:
the performance training apparatus set forth in claim 1;
a performance operation unit operable by a user; and
a sound generation apparatus that generates a sound performed via the performance operation unit.

12. A computer-implemented performance training method comprising:
for each sound of a model performance, acquiring performance information designating a sound generation timing and sound and intensity information indicative of an intensity of the sound from a database, the sound generation timing corresponding to a timing at which a user is to actuate the performance training apparatus;
progressing a performance time; and
in accordance with a progression of the performance time and for each sound of the model performance, acquiring the intensity information ahead of the sound generation timing and presenting the intensity of the sound based on the acquired intensity information via an output device before the sound generation timing.

13. The performance training method as claimed in claim 12, further comprising:
in response to a performance operation executed by a user in accordance with the progression of the performance time, acquiring user's performance information indicative of a sound performed by the user, the user's performance information including information indicative of an intensity of the sound; and
presenting the intensity of the sound performed by the user based on the user's performance information.

14. The performance training method as claimed in claim 13, further comprising:
based on a comparison between the intensity information and the information indicative of the intensity of the sound included in the user's performance information, presenting information indicative of a difference between the intensity of the sound in the model performance and the intensity of the sound in the user's performance.

15. The performance training method as claimed in claim 12, wherein the intensity of the sound is presented at least in a visual or audible manner via the output device.

16. The performance training method as claimed in claim 15, wherein, in a case where the intensity of the sound is to be presented in the visual and audible manners, a time length of the presentation in the visual manner is longer than a time length of the presentation in the audible manner.

17. The performance training method as claimed in claim 12, further comprising:
acquiring presentation timing information that, in association with the intensity information of each sound of the model performance, specifies a presentation timing, at which the intensity of the sound is to be presented, that precedes the sound generation timing of the sound,
wherein the intensity information is acquired ahead of the sound generation timing in accordance with the presentation timing information, and the intensity of the sound is presented based on the acquired intensity information via the output device.

18. The performance training method as claimed in claim 12, wherein the intensity of the sound is presented at any one of a plurality of predetermined stages.

19. The performance training method as claimed in claim 18, further comprising:
presenting to the user, via the output device, an example of a way of presenting the intensity of the sound for each of the plurality of predetermined stages.

20. The performance training method as claimed in claim 12, further comprising:
activating a performance guide device that, based on the performance information of each sound of the model performance and in accordance with the progression of the performance time, guides the user about a sound to be performed by the user.

* * * * *